No. 839,317. PATENTED DEC. 25, 1906.
P. RAPOPORT.
ASH SIFTER.
APPLICATION FILED DEC. 2, 1905.

Witnesses:
E. A. Jarvis

Inventor:
Paul Rapoport,
By his Attorney.

THE NORRIS PETERS CO., WASHINGTON, D. C.

UNITED STATES PATENT OFFICE.

PAUL RAPOPORT, OF NEW YORK, N. Y.

ASH-SIFTER.

No. 839,317.  Specification of Letters Patent.  Patented Dec. 25, 1906.

Application filed December 2, 1905. Serial No. 289,845.

*To all whom it may concern:*

Be it known that I, PAUL RAPOPORT, a subject of the Czar of Russia, residing in New York city, borough of Manhattan, New York, have invented certain new and useful Improvements in Ash-Sifters, of which the following is a specification.

My invention relates to improvements in ash-sifters particularly adapted for household use, and has for its object to provide a sifter wherein ashes will be given an up-and-down jarring motion, the dust can be confined wholly within the device, and from which the separated cinders and ashes may be readily removed.

The invention comprises the novel details of improvement that will be more fully hereinafter set forth and then pointed out in the claim.

Reference is to be had to the accompanying drawings, forming part thereof, wherein—

Figure 1:
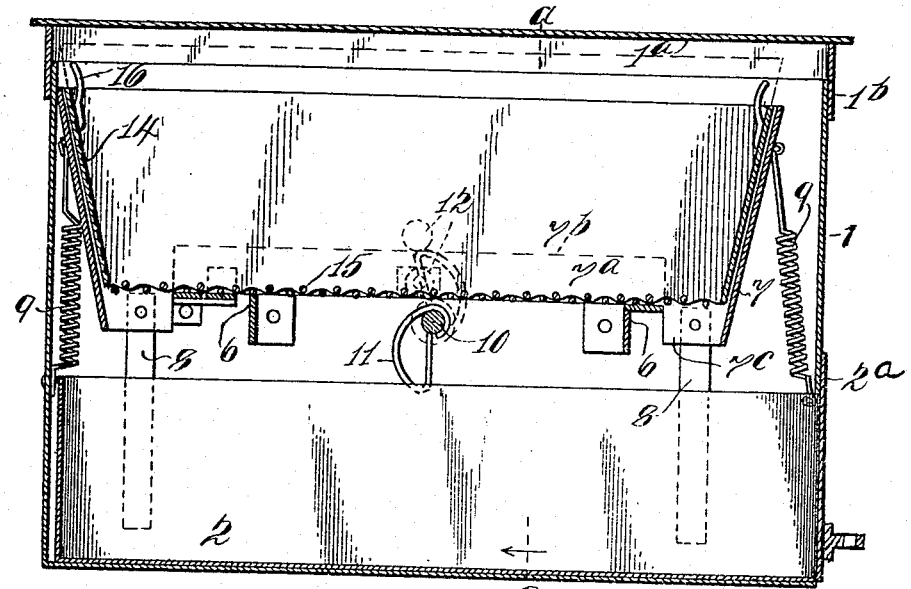
Figure 2:
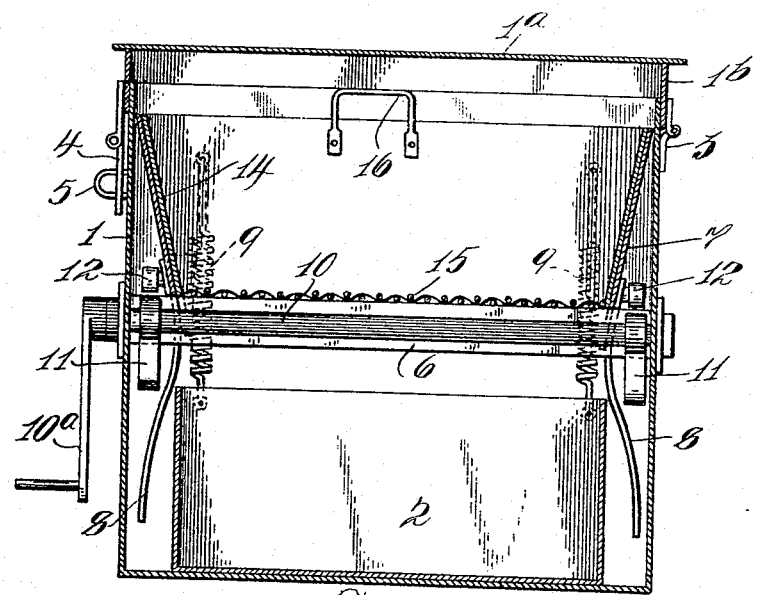

Figure 1 is a central section of an ash-sifter embodying my invention, and Fig. 2 is a cross-section on the line $a\,a$ in Fig. 1 looking in the direction of the arrow.

In the accompanying drawings, in which similar numerals of reference indicate corresponding parts in both views, the numeral 1 indicates a closed casing or box having a removable ash-drawer 2, adapted to slide through an opening in one wall of the casing and shown having a flange $2^a$ fitting against the outer side of the casing to close the opening therein, and at $1^a$ is a cover for the casing shown provided with depending flanges $1^b$, fitting around the open top of the casing, which cover may be hinged to the casing, as by hinges 3, and the cover may be held closed by a latch 4, engaging a staple 5 on the casing, whereby the casing may be tightly closed for use and the cover may be thrown back for access to the interior of the casing.

Within casing 1 are transversely-disposed bars or rests 6, upon which a reciprocative frame or hopper 7 rests. Said hopper 7 is open at the top and bottom and is shown having downwardly-converging walls, the under surface of opposite side walls being shown cut away at $7^a$, so that the edges $7^b$ may rest upon the bars 6 and the depending parts $7^c$ may extend below the bars 6 in the nature of guides when the hopper rests upon said bars. The hopper 7 is shown provided with depending fingers 8, which serve to keep the hopper in proper operative position during its reciprocating motions by engaging with the side walls of the casing, the upper edges of the hopper 7 also being adapted to engage the side walls of the casing, as indicated in Fig. 2, to serve in guiding the hopper.

At 9 are springs attached to the hopper and also to casing 1 to draw the hopper downwardly and hold it upon the bars 6, although the hopper may be allowed to drop by gravity.

At 10 is a shaft extending across casing 1 and journaled thereon, the shaft being located beneath hopper 7, and said shaft has cams 11 secured near opposite ends and shown located on opposite sides of hopper 7, adapted to lift said hopper, as by means of interposed rollers or projections 12, carried by the hopper, the shape of the cams being such as to lift the hopper during part of the rotation of the cams and to then pass from the rollers 12 to allow the hopper to suddenly descend upon the bars 6, assisted by the influence of springs 9.

Within the hopper 7 is a receptacle 14 for the ashes to be sifted, which receptacle is open at the top and bottom and provided at the bottom opening with a screen or wire-gauze 15, upon which the ashes rest. The receptacle 14 fits snugly within hopper 8, so as to rise and fall therewith, and said receptacle is shown having its walls corresponding to the walls of hopper 7, or, in other words, the walls of receptacle 14 converge downwardly substantially parallel to the walls of hopper 7, so as to fit in and be supported by said hopper. Handles 16 upon receptacle 14 permit the latter to be removed from hopper 7 as required.

The operation is as follows: The parts being assembled and cover $1^a$ closed, the hopper 7, resting upon the bars 6, with the cams 11 hanging down, as shown in the drawings, and the receptacle 12 filled with ashes to be sifted, the shaft 10 is rotated to the right in Fig. 1 by its handle $10^a$. The cams 11 thereupon lift the hopper 7, and thereby raise the receptacle 14 and the contained ashes, and when the cams pass from the rollers 12 the weight of the hopper, if springs 9 are not employed or in conjunction with said springs when employed, causes the hopper to suddenly descend until it comes to rest upon the bars 6, thereby carrying the receptacle 14 and the contained ashes down with it, and as the hopper and the ashes are suddenly checked in their descent the ashes will be shaken and the finer particles will sift through the screen 15. The speed of rotation of shaft 10 of course determines the character of sifting to be accomplished, the sifted particles falling into the drawer 2. After the sifting has been completed and the floating particles have settled the cover 1ª is removed, the receptacle 14 lifted out, its contents disposed of, and then replaced, and the ash-drawer 2 can be removed and replaced.

Having now described my invention, what I claim is—

The combination of a casing and means for tightly closing the same, a shaft extending across the casing and provided with cams near opposite ends, a hopper within the casing above the shaft provided with projections on opposite sides above the cams and independent thereof to be engaged by the cams for raising the hopper bodily freely in an upward direction, said cams being arranged to release the projections and permit the hopper to drop suddenly free from the cams, supports carried by the casing and extending beneath the hopper to support the latter when free from the cams and a receptacle adapted to fit within the hopper and provided with an open top and a perforated bottom.

P. RAPOPORT.

Witnesses:
BENJAMIN CHESS,
T. F. BOURNE.